Figure 1:
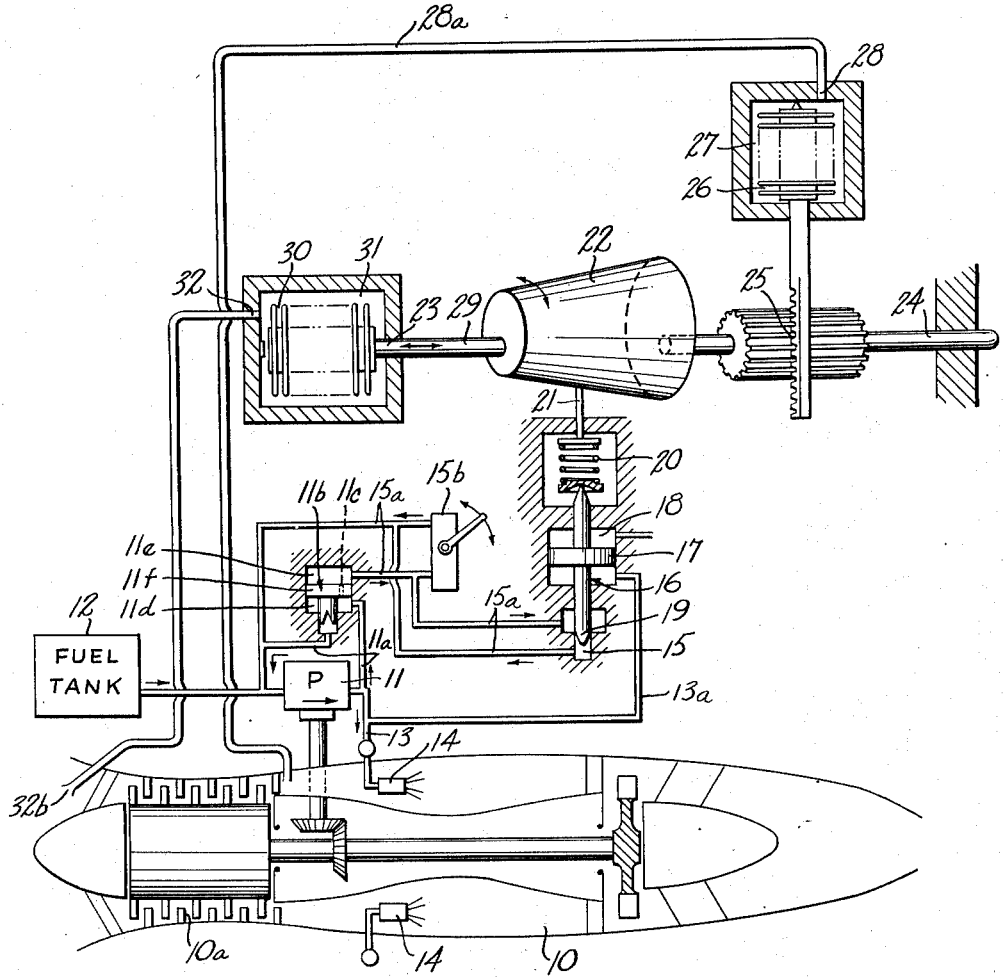

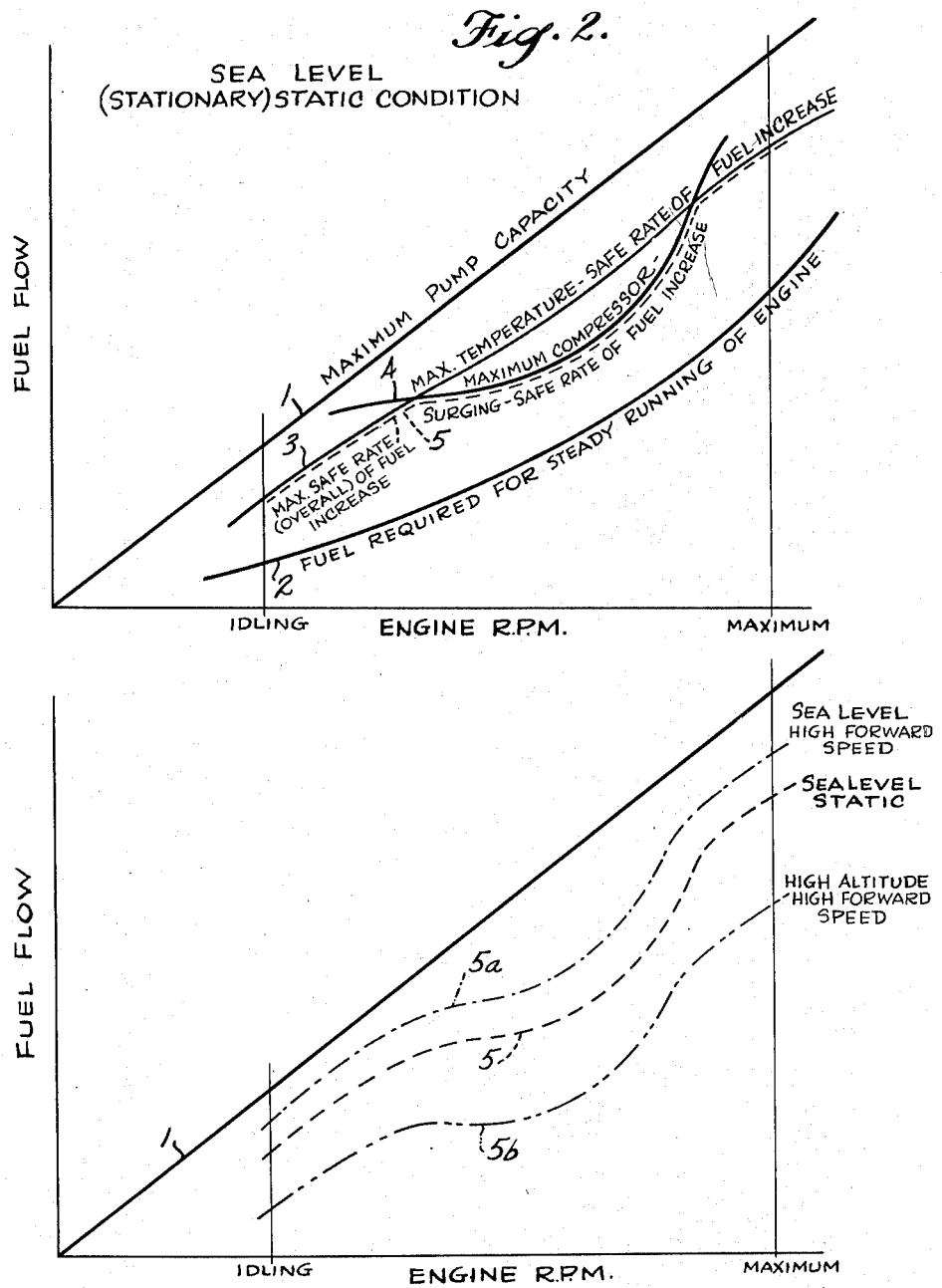

Patented May 19, 1953

2,638,742

UNITED STATES PATENT OFFICE 2,638,742

MEANS FOR LIMITING THE SUPPLY OF FUEL TO CONTINUOUS COMBUSTION TURBINE ENGINES DURING ACCELERATIONS OF THE LATTER

Frederick H. Carey, Cheltenham, England, assignor to Dowty Equipment Limited, Cheltenham, England, a British company Application April 18, 1951, Serial No. 221,627
In Great Britain April 19, 1950

3 Claims. (Cl. 60—39.28)

The present invention relates to the supply of liquid fuel to the burners, vaporizers, or equivalent (hereinafter referred to simply as burners) of aircraft continuous combustion turbine engines, and more specifically to means whereby the fuel supply is limited during periods of acceleration.

When an engine is accelerated it is not only important that sufficient fuel shall be permitted to reach the engine, but it is also of importance that the quantity that can reach it does not exceed certain limits. If the fuel supply exceeds what is necessary to achieve the desired acceleration the result may be that the engine will suffer damage from overheating and that the engine air compressor may be subjected to surging or stalling.

Considering firstly the problem of preventing overheating of the engine, a curve (Figure 2) can be plotted showing the maximum safe limits of fuel supply under any given condition of ambient pressure, throughout the speed range of the engine. By keeping the supply down below these limits for all speeds, overheating can be avoided. Considering next the problem of preventing compressor surging or stalling, another curve can be plotted showing the safe limits under like conditions from this point of view. By superimposing these curves, they may be seen to overlap and cross one another, and by keeping the fuel supply down below either curve throughout the whole speed range of the engine the necessary safety from both points of view can be achieved. The lower composite curve thus represents the safe limits of rate of fuel supply to the engine for conditions of varying engine speed at specified pressure conditions.

Variation in altitude with corresponding variation in the density of the ambient atmosphere will affect the height of the curve as a whole (Figure 3), and constitutes the second variable which must be taken into consideration. A similar effect may result from changes in the forward speed of the aircraft, and this may conveniently be combined with the altitude effect.

According to this invention, a liquid fuel supply system for an aircraft gas turbine engine, comprising a servo-operated device shiftable under control of known vent closure means in the opening sense to decrease the rate of fuel flow to the engine, and in the closing sense to increase such fuel flow rate, has associated with it a servo vent valve adapted to be opened to terminate shifting of the servo-operated device in the closing (fuel-flow-increasing) sense, whereby the servo-operated device is caused to operate in such manner as to prevent the rate of fuel flow from exceeding safe limits during rapid accelerating conditions of the engine, and the servo-vent valve thus described, forming the limiting element of the associated controls, is characterized in that the closure member of said servo vent valve is subject to a loading means which is responsive to the rate of fuel flow to the engine and which tends to move the closure member in the opening sense, and is subject to spring loading means which tends to move the closure member in the closing sense and which reacts between said closure member and a movable abutment, in that said abutment is formed by the surface of a cam of calculated configuration, which cam is rotatable to move in one operative direction and is displaceable along the axis of rotation to move in another operative direction, in that a first capsule or equivalent device responsive to a pressure which varies with engine speed is connected with the cam to move the latter in one operative direction, and in that a second capsule or equivalent device responsive to changes in the density of the ambient atmosphere is connected with the cam to move the latter in the other operative direction.

By these means the closure member of the servo vent valve is subjected in one sense to a loading derived from two independent variables of which one is engine speed and the other the pressure of the ambient atmosphere, and in the opposite sense to a loading derived from the rate of fuel supply to the engine. When the loading derived from the rate of fuel supply to the engine has reached a value greater than the loading derived from the two independent variables, closure of the servo vent valve will be terminated to prevent any further increase in the rate of fuel supply to the engine, and the engine will thus be safeguarded both from temperature and surging points of view. It will be appreciated that at any condition of flight the loading derived from the two independent variables sets a datum to be overcome by the loading derived from the rate of fuel supply. All the while the engine is receiving fuel at a rate below the maximum permitted rate, the mechanism in accordance with the invention will play no part in controlling the servo-operated device which latter will be controlled by other and known servo vent means. As soon as the control by said other servo vent means tends to permit the engine to receive more fuel than the maximum safe rate, the mechanism in accordance with the invention operates to prevent the safe rate from being exceeded.

A liquid fuel supply system in accordance with the invention will now be described by way of example with reference to the accompanying diagrammatic drawing, wherein Figure 1 is a diagram of the system; Figure 2 is a curve illustrating safe limits of fuel supply under static conditions, and Figure 3 is a similar curve showing the displacement of the safe limit due to change in ambient pressure.

In the system shown, a fuel pump 11 driven by the turbine engine 10 withdraws fuel from a fuel tank 12 and delivers it along a line 13 to the burners 14 of the engine. The fuel pump 11 illustrated is of the fixed stroke type and has an associated by-pass 11a controlled by a known servo-operated device in the form of a by-pass valve 11b. The by-pass valve 11b assumes a position in accordance with the rate of flow through a restricted communication 11c between the pressure spaces 11d and 11e at opposite sides respectively of a piston portion 11f of the valve. The space 11e is connected by conduit 15a extending to the inlet or low pressure side of the fuel pump 11. In this conduit 15a there is provided one or more servo vent valves for controlling flow in known manner along the conduit and hence controlling the position of the by-pass valve 11b, which in turn controls the quantity of fuel that is permitted to return along the by-pass 11a and the quantity that is allowed to reach the burners or vaporizers 14. The apparatus of the present invention is supplemental to the known controls thus far described, being concerned with the control over the closure member of what may be termed a limiting vent, which latter is normally closed by the closure member and which is opened when the rate of fuel flow to the burners or vaporizers 14 tends to exceed a safe amount. So long as the engine is receiving fuel at a rate below the maximum permitted rate, the limiting vent will play no part in controlling the by-pass valve 11b which latter will be controlled by another servo vent in the conduiting 15a, for example by a servo vent forming part of a governor 15b of any known or convenient kind, such, for instance, as is disclosed in my application Serial No. 221,628, filed coincidentally with this application.

The limiting vent is indicated at 15 and is controlled by a servo vent control valve indicated generally at 16 which, in this example, includes a piston 17 operating in a cylinder 18. The valve 16 has a closure member or head 19 on a stem which is movable as one with piston 17. The face of the piston 17 adjacent the closure member 19 is exposed to pressure in the fuel delivery line 13 by way of conduit 13a, which pressure is a measure of the rate of fuel supply to the burners. Increases in burner pressure thus tend to move the closure member 19 in the vent opening sense. The space immediately above the piston 17 is vented to atmosphere or low pressure. The closure member 19 is loaded in the vent closing sense by a spring 20 which reacts between the upper end of the stem of the valve 16 and, through a plunger 21, a movable abutment constituted by a three-dimensional cam 22 of calculated configuration.

The cam 22 is journaled in bearings 23 and 24, and is adapted to be moved in one operative direction (rotatively) by being rotated through suitable mechanism represented by the rack and pinion mechanism 25 of which the rack is attached to an evacuated capsule 26 in a chamber 27 having an inlet 28 connected by conduit 28a to the engine 10 at the delivery side of the air compressor 10a of the engine. The capsule 26 is therefore subjected externally to the delivery pressure of the engine air compressor. The air compressor delivery pressure varies substantially as a function of engine rotational speed and the cam 22 is thus positioned rotatively in accordance with this speed. The spindle 29 of the cam 22 is secured to an evacuated capsule 30 in a chamber 31 having an inlet 32 connected by conduit 32a to a nozzle 32b at the intake end of the engine. The capsule 30 is thus influenced externally by changes in the density of the ambient atmosphere as affected by altitude and forward speed. The capsule 30 will control the cam 22 in its other operative direction (axially) by positioning the cam longitudinally thereof. There may be disposed between the capsule 26 and the rack 25, and between the capsule 30 and the spindle 29, servo mechanism of any kind which will magnify the two variable forces before they are applied to the cam 22.

The configuration of the cam 22 will be arrived at from calculations based on the characteristics of the engine in order to provide for the maximum safe rate of fuel supply to the engine during any accelerating condition of flight. The configuration of the cam 22 in conjunction with its movements under the control of the capsules 26 and 30 gives to the spring 20 loading the valve 16 a force which permits the opposed variable loading on the valve 16 to shift the valve head or closure member 19 to open the vent 15 at the instant when the pump 11 is delivering the maximum safe amount of fuel along the delivery line 13, thus safeguarding the engine from overheating, and safeguarding the air compressor against surging or stalling.

The servo-operated device 11b in the example above described moves to control the effectiveness of a by-pass across a pump which, as illustrated, is of the fixed stroke type, but it will be understood that the servo-operated device may in known manner move to control the setting of the stroke varying element of a pump of the variable stroke type. Alternatively the servo-operated device may control or constitute a throttle in the delivery line from a fuel pump of the centrifugal type. In all cases, and however it is itself controlled, the servo-operated device 11b controls the rate of fuel flow to the engine burners.

I claim:

1. In a liquid fuel supply system for an aircraft gas turbine engine, a servo-operated device controllably shiftable in opening and closing senses respectively to decrease or increase the rate of fuel flow to the engine, a servo vent valve including a closure member therefor, operatively connected to said servo-operated device to be capable of terminating shifting of the latter in the closing, fuel-flow-increasing sense; a first loading means responsive to the rate of fuel flow to the engine and operatively connected to the said closure member to bias the latter in the opening sense, a second loading means also operatively connected to the said closure member to bias the latter in the closing sense, said second loading means including spring means reacting between said closure member and a movable abutment, said movable abutment comprising a three-dimensional cam of calculated configuration which cam is mounted for rotation, to be thereby movable in one operative direction, and for displacement along its axis of rotation, to be thereby movable in a second operative direction, a first pressure-responsive means responsive to variations in engine rotational speed and operatively connected to the cam to move it in one of its two operative directions, and a second pressure-responsive means responsive to changes in the density of the ambient atmosphere and operatively connected to the cam to move it in the other of its operative directions, the configuration of the cam abutment of the second loading means being such relative to said first loading means that for any condition of flight the first loading means will overcome the second loading means to open the servo vent valve to terminate shifting of the servo-operated device in the closing sense when the rate of fuel flow to the engine tends to exceed a predeterminate safe limit during rapid accelerating conditions of the engine.

2. A liquid fuel supply system as in claim 1, characterized in that said first pressure-responsive means, responsive to variations in engine rotational speed, is operatively connected to the cam to shift the latter in its rotative direction, and the second pressure-responsive means, responsive to changes in density of the ambient atmosphere, is operatively connected to the cam to shift the latter in its axial direction, and the cam is correspondingly configured.

3. A liquid fuel supply system as in claim 1, characterized in that the second pressure-responsive means, responsive to changes in the density of the ambient atmosphere, includes a forwardly facing air intake funnel and a conduit leading thence, and a pressure-sensitive element subject to the intaken air pressure as delivered by said conduit, and operatively connected to the cam, to shift the latter in accordance with dynamic or static change in such intaken air pressure.

FREDERICK H. CAREY.

References Cited in the file of this patent

UNITED STATES PATENTS

| Number | Name | Date |
|---|---|---|
| 2,350,781 | Lichte | June 6, 1944 |
| 2,426,153 | Mock | Aug. 19, 1947 |
| 2,427,835 | Campbell | Sept. 23, 1947 |
| 2,450,535 | Watson et al. | Oct. 5, 1948 |
| 2,456,603 | Barfod | Dec. 14, 1948 |
| 2,479,813 | Chamberlin et al. | Aug. 23, 1949 |
| 2,529,900 | Bedale et al. | Nov. 14, 1950 |
| 2,545,703 | Orr | Mar. 20, 1951 |
| 2,581,276 | Mock | Jan. 1, 1952 |